United States Patent [19]

Hines

[11] Patent Number: 4,646,801

[45] Date of Patent: Mar. 3, 1987

[54] PICTURE FRAME MOLDING HOLDING AND CUTTING APPARATUS AND METHOD OF USING

[76] Inventor: Thomas E. Hines, 327 W. Prospect Ave., Elkton, Va. 22827

[21] Appl. No.: 814,499

[22] Filed: Dec. 30, 1985

[51] Int. Cl.[4] ........................ B27L 11/00; B27B 5/20; B23Q 1/04

[52] U.S. Cl. .................................. 144/375; 83/477.2; 83/581; 144/216; 269/81; 269/304; 269/319

[58] Field of Search ................ 269/227, 228, 81, 304, 269/319; 83/477.2, 581; 144/216, 217, 375, 372

[56] References Cited

U.S. PATENT DOCUMENTS

| | | | |
|---|---|---|---|
| 3,901,498 | 8/1975 | Novak | 83/477.2 |
| 3,941,020 | 3/1976 | Huntley et al. | 83/477.2 |
| 3,986,420 | 10/1976 | Huntley et al. | 83/581 |
| 4,123,955 | 11/1978 | Marlow | 83/581 |
| 4,317,562 | 3/1982 | Thiodaux | 83/477.2 |

*Primary Examiner*—W. D. Bray
*Attorney, Agent, or Firm*—A. W. Breiner

[57] ABSTRACT

A picture frame molding holding and cutting apparatus and a method of using the apparatus is described. The apparatus has a miter square, adjustable stop means and adjustable clamping means for holding a molding to be cut in position during the cutting of the ends of the molding. A means and method of accurately measuring and holding a molding during cutting to produce a desired final length utilizing a frame molding pattern is also described.

11 Claims, 5 Drawing Figures

PICTURE FRAME MOLDING HOLDING AND CUTTING APPARATUS AND METHOD OF USING

FIELD OF INVENTION

The invention relates to an apparatus for and a method of holding and accurately cutting a picture frame molding and constructing picture frames using cut frame moldings. More particularly, an apparatus having a miter square and adjustable clamping means for use in holding and cutting a picture frame molding and a method of using the apparatus is described. A method of using the apparatus with a frame molding pattern for accurately cutting the length of a molding is also described.

BACKGROUND AND PRIOR ART

It is known in the art to use a miter square having a specific type of clamp on a saw table for holding a picture frame molding which is to have its ends cut at an angle. The placement of a scale on top of the miter square for measuring the picture frame molding to be cut is also known.

U.S. Pat. No. 243,533 discloses a miter square on a saw table having adjustable rests on the inside edges of the miter square for adjusting the angle at which a piece of molding is cut. A rest is vertically adjusted by turning a screw which extends through the top of the rest. Horizontal adjustment of the rests are provided by thumb-screws located on the miter square. The horizontal adjustment of the rests is disclosed as providing a variation to the true miter angle.

U.S. Pat. No. 345,590 discloses a miter box for making picture frames. The miter box contains measuring scales thereon. Prior to cutting, the molding is pressed against one edge of the miter block and held in place by a clamping screw tightened to press against one portion of the molding. The end of the molding projects beyond the right angle of the miter square. A saw is fitted between guide posts located opposite the right angle of the miter square. The guide posts hold the saw at an angle during the cutting of the molding.

U.S. Pat. Nos. 408,248 and 2,787,825 each disclose a specific clamping arrangement for holding a picture frame molding against the edge of a miter square.

The clamping arrangements disclosed in the prior art for holding a piece of molding next to a miter square while the molding is being cut, do not adequately secure the molding from movement so as to insure that the molding is not damaged due to movement or that a smooth and accurate cut is made. The prior art methods are also time consuming. Securing a molding with a clamping screw, such as shown in the prior art, must be done slowly in order to insure that too much pressure is not placed on the molding, thereby damaging the molding by scarring or the like, or to insure that too little pressure is not used resulting in the movement of the molding during the cutting operation. Such movement would cause a ragged or badly angled cut and/or scarring or other damage of the molding due to movement of the molding against the clamping screw. Additionally, the miter square assemblies shown in the prior art for cutting picture frame moldings do not provide a means for determining an accurate measurement of the molding length without physical measurement or a means of holding the molding so the proper length is accurately cut. The miter square assemblies disclosed in the prior art rely on the operator's visual and subjective judgement in positioning a molding and tightening the clamping screw.

OBJECTS AND BRIEF DESCRIPTION OF INVENTION

Accordingly, it is an object of the present invention to provide a picture frame molding holding and cutting apparatus having a simple construction while providing the ability to easily and accurately position and hold a picture frame molding for cutting.

It is a further object of the invention to provide an apparatus for cutting a picture frame molding that complements the angle of other moldings and uses a frame molding pattern for cutting a desired length of molding.

It is a further object of the invention to provide a method of holding and cutting a picture frame molding which provides that the finished cut molding complements other moldings cut on the apparatus as to angle and length.

It is a further object of the invention to provide a method of making a picture frame which includes a simple and accurate means of holding and cutting the frame moldings which are joined to form a picture frame.

The objects of the invention will be apparent from the following brief description of the invention and detailed description of a preferred embodiment.

The picture frame molding holding and cutting apparatus of the invention comprises a miter square positioned on top of a base having a slot therein for receiving a saw blade. The slot extends from the edge of the base located opposite the right angle of the miter square and passes through the right angle of the miter square. Positioned parallel to each outwardly facing side of the miter square is an adjustable clamping means situated on top of an adjustable stop which is affixed to the apparatus base. A picture frame molding is secured from movement during the cutting operation by (1) placing the molding against one outside edge of the miter square, (2) by adjusting and securing the stop on which the clamping means rests against the other side of the molding, and (3) adjusting the clamping means downward onto the molding. The stop extends along a substantial length of the molding. The position of the stop is automatically determined by the width of the molding. The adjustment of the clamping means is automatically determined by the height of the picture frame molding. The arrangement of the stop and clamping means is identical for each side of the miter square. The outward side of the miter square which is used during the cutting of the second end of the molding has an end stop on the end of the leg of the miter square opposite the right angle of the miter square when a frame molding pattern is used.

The method of holding and cutting a piece of molding begins with the placement of the molding against one outwardly facing side of the miter square, securing the holding means and cutting the first end. The cutting is finished by removing the molding from the first side and placing the molding against the second outwardly facing side of the miter square, securing the holding means and cutting the second end of the molding and thereby also determining the final length of the molding. Angled ends are cut which are subsequently joined to other angle cut moldings to form a picture frame.

Proper measurement of the final molding length may be determined by using an appropriately sized frame molding pattern during the second cutting operation. A molding used in making a picture frame must have an angle cut at each end of the molding. The first end is cut without consideration to the final length of the molding. During the cutting of the second end, the final length of the molding is determined by the location of the cut to the molding. An accurate length is determined without the necessity of physical measurement by the worker through the use of an appropriately sized frame molding pattern. The molding pattern is placed between the edge of the miter square, the stop holding the clamping means and the end stop located at the end of the leg of the miter square opposite the right angle of the miter square. The previously cut end of the molding is then placed adjacent to the molding pattern so that their ends meet. The position of the molding pattern aids in securing the molding being cut from movement to insure an accurate length and angle cut. The excess length of the molding being cut extends beyond the saw slot. The molding is further secured in place by securing the stop and adjusting the clamping means. The second end of the molding is then cut. The size of the molding pattern utilized is determined by the desired final size of the molding being cut.

DRAWING

DETAILED DESCRIPTION OF THE INVENTION

Figure 1:
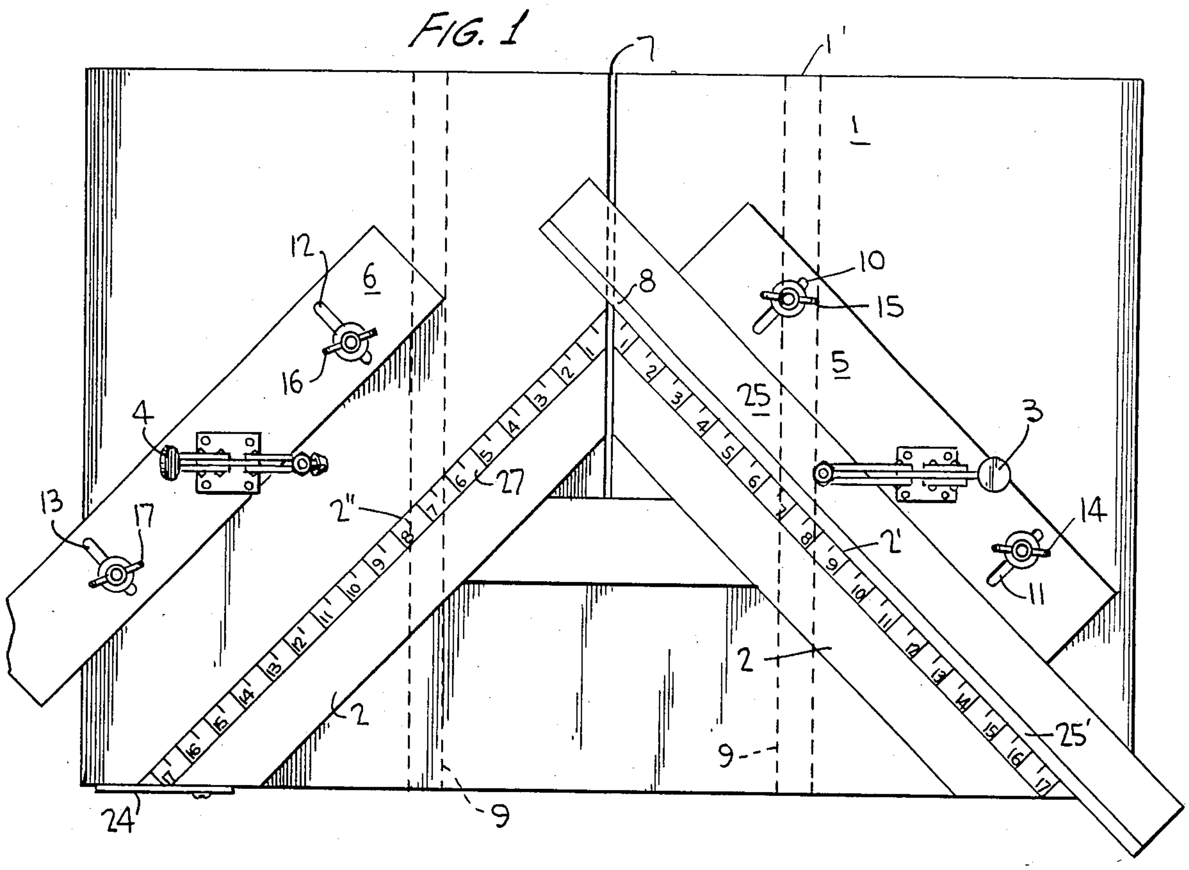
FIG. 1 shows a top plain view of the picture frame molding, holding and cutting apparatus of the invention holding a picture frame molding uncut at both ends.
Figure 2:
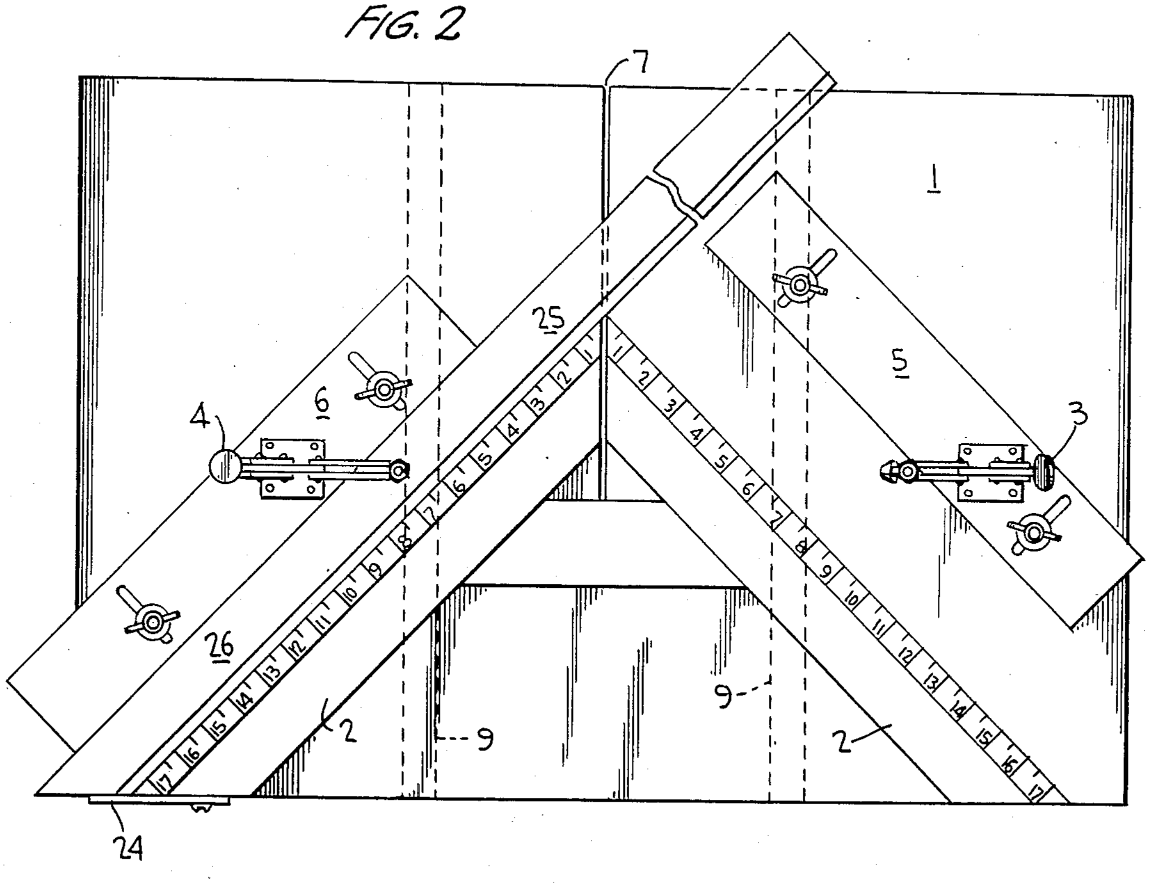
FIG. 2 shows a top plain view of the picture frame molding, holding and cutting apparatus of the invention holding a molding having one end cut and a frame molding pattern.
Figure 3:
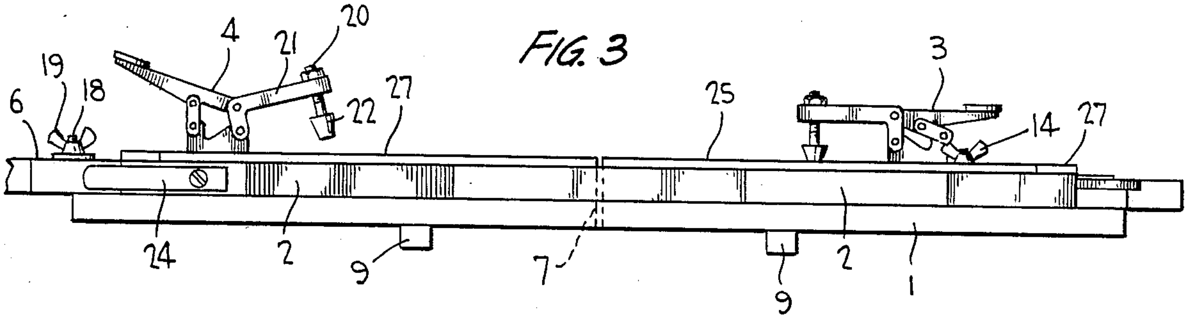
FIG. 3 shows a vertical end section view of the picture frame molding, holding and cutting apparatus of the invention.

A preferred embodiment of the picture frame molding holding and cutting apparatus of the invention is shown in FIGS. 1, 2 and 3.

The picture frame molding, holding and cutting apparatus includes a base (1), for example, a saw table on which a miter square (2), clamping means (3) and (4), and stops (5) and (6) are located. A saw slot (7) extends from the edge (1′) of the saw table base located opposite the right angle corner (8) of the miter square, through and extending beyond the right angle of the miter square (8). A measuring scale, such as a standard ruler, is on the top surface of each leg of the miter square with zero at the right angle of the miter square. Platforms or support blocks (9), best shown in FIG. 3, can be affixed to the bottom of the saw table base (1) for spacing the saw table base (1) from a second surface. The spacing provided by the platforms (9) allow for the use of a saw with the apparatus while the apparatus is located on a second surface such as a table, work bench or the like. The number and dimensions of the platforms may be varied. The platforms, however, must provide a stable foundation and not intersect the saw slot (7). The apparatus of the invention may also have legs attached to the saw table base rather than platforms or in addition to platforms if the legs are removable, so that the apparatus can be a free-standing, self-supporting structure.

Located in a spaced parallel relationship to each outwardly facing side of the miter square (2) is an adjustable clamping means, (3) and (4), positioned on top of an adjustable stop, (5) and (6).

Each stop has preferably two oblong slots, (10) and (11) in stop (5), (12) and (13) in stop (6), extending substantially the total width of the stop. The length of the slot determines the degree of movement which is allowed to the stop. Located within each slot is a stop securing means, such as a screw and wing nut assembly, (14) and (15) in stop (5) and (16) and (17) in stop (6). The securing means when consisting of a screw and wing nut assembly has a screw (18) as shown in FIG. 3, affixed to the saw table base (1) and extending up through the slot in the stop. To secure the stop, a wing nut (19) is adjusted downward until the nut contacts the top surface of the stop, or washer, if one is utilized, on the top surface of the stop. The shape of the stop is preferrably rectangular. The rectangular shaped stop provides a uniform and secure fit in terms of pressure and position against the molding to be cut when the molding is pressed against the outwardly facing side of the miter square. Since the securing means contacts the stop rather than the molding, no single point of pressure is applied to the molding which may scar or otherwise damage the molding. The stop acts as a border rather than a pressure point such as when a screwing clamp is used.

Located on the top surface of each stop is a clamping means. The stops, (5) and (6), are used to secure a molding from moving in a horizontal manner and the clamping means, (3) and (4), are used to secure a molding from moving in a vertical manner. The clamping means (3) and (4) are operated with an upward or downward motion depending on whether the clamping means is being adjusted to release the molding (upward) or to hold the molding in position (downward). The clamping means, due to its upward and downward adjustment motion, is essentially self adjusting to the height of the molding since the clamping means stops moving when it contacts the top of the molding. In the event a smaller or larger than average piece of molding is being cut, an additional adjustment means, such as a screw means (20) as shown in FIG. 3, may be included in the clamping structure. To adjust the height of the clamping head (22), the screw means (20) in the end of the clamping means (21) is used to adjust the height of the clamping head (22). The clamping head (22), which is the part of the clamping means which contacts the molding, is preferrably made from rubber, plastic, or the like so as to avoid scarring or otherwise damaging the molding (25) which is held by the clamping means.

An end stop (24), shown in FIGS. 1, 2 and 3, is preferrably affixed to one end edge of the miter square leg which is not at the right angle of the miter square. The miter square leg to which the end stop (24) is affixed, is the leg against which the molding is pressed during the second cutting operation. The end stop (24) extends parallel to the edge of the saw table base. The end stop (24) serves as a secondary securing means to stop (6) for the molding pattern which may be used during the second cutting operation. The use and description of the molding pattern will be further described below. The end stop (24) may also be affixed to the edge of the saw table base (1) and extend upward.

The preferred method of utilizing the picture frame molding holding and cutting apparatus described above is simple, requires few motions, and no physical measuring when a frame molding pattern is used. The first step is to adjust clamping means (3) upward and unsecure stop (5). Stop (5) is then slid out in the direction opposite the outward edge (2′) of the miter square. An uncut piece of molding (25) is then placed in the area between the edge of the miter square (2′) and stop (5) so that the picture mounting groove portion (25′) of the molding is facing the edge (2′) of the miter square and the end of the molding nearest the right angle (8) of the miter square intersects the saw slot (7). By making reference to the measuring scale, it can be determined that the molding used has sufficient length to make the final desired length. Stop (5) is then moved in the direction of the miter square until it contacts the molding and the molding is pressed against the side (2′) of the miter square and thereby stop (5) is not able to move forward anymore. The position of the stop is automatically determined by the width of the uncut molding. The securing means located in oblong slots (10) and (11) of stop (5) are adjusted so as to secure stop (5) in position. Clamping means (3) is then adjusted downward to further secure the uncut molding. Stop (5) secures the molding from moving horizontally and clamping means (3) secures the molding from moving vertically. It is understood, however, that clamping means (3) additionally aids to secure the molding (25) from moving horizontally and that stop (5) aids to secure the molding (25) from moving vertically due to the pressure placed on the molding by clamping means (3) and stop (5). Securing the molding in firm position results in a smooth accurate cut of the molding. After the molding is secured, the saw is moved along the length of the saw slot (7) so as to cut the end of the molding intersecting the saw slot (7) resulting in an angle cut on the end of the molding.

The preferred method of cutting the second end of the molding (25) is then carried out as shown in FIG. 2. Clamping means (4) is adjusted upward and stop (6) is unsecured and slid in the direction opposite the edge (2″) of the miter square. A suitably sized frame molding pattern (26), for determining the final length of the molding, as discussed below, is positioned against the edge (2″) of the miter square and the end stop (24). The molding (25) is then removed from the first side of the miter square by adjusting the clamping means (3) upward and unsecuring stop (5). The molding is repositioned against edge (2″) of the miter square with the uncut end positioned next to the right angle of the miter square, the cut end adjacent the end of the molding pattern and the mounting groove adjacent the miter square. The uncut end will intersect saw slot (7). The molding pattern is positioned so that its end complements the cut end of the molding being cut as shown in FIG. 2. It is understood that the molding pattern may be positioned after the molding to be cut (25) has been positioned without any disadvantage. The stop (6) is then slid towards the miter square until it contacts the molding (25) and the frame molding pattern (26) and both pieces are pressed against the edge (2″) of the miter square. The stop (6) is then secured. The end stop (24) further insures the securing of the frame molding pattern (26) against the molding (25) to be cut. Clamping means (4) is adjusted downward until it contacts the molding (25). The uncut end of the molding intersecting the saw slot is then cut by moving a saw blade through the saw slot (7). The sized cut molding (25) is then removed from the apparatus and is ready for use in the construction of a picture frame.

In cutting a molding for use in constructing a picture frame, it is not necessary to utilize a molding pattern with the apparatus of the invention as described above. The apparatus may be used in the second cutting operation in the same manner as described for cutting the first end. However, physical measurement will be required for measuring the final length desired before the molding is secured in position for cutting against the second outward side of the miter square and also after cutting to confirm that the molding was properly cut. The measuring scale located on top of the miter square leg can be used for determining the final length of the molding. When an appropriate molding pattern is utilized, these two extra steps are not necessary. If a molding pattern is not utilized with the apparatus, an end stop (24) located on the leg of the miter square, as described above, need not be a part of the apparatus.

Figure 4:
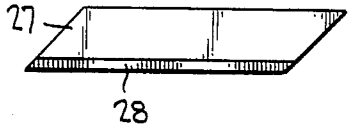
FIG. 4 shows a frame molding pattern which is utilized in the second cutting operation.
Figure 5:
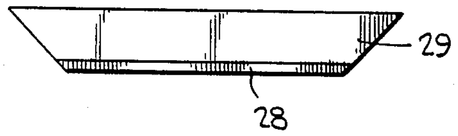
FIG. 5 shows a finished cut picture frame molding.

To provide for the accurate measurement and accurate final length of the molding without physical measurement, a frame molding pattern is utilized during the cutting of the molding's second end. As described above, the frame molding pattern (26) is positioned against the cut edge of the molding (25), the edge (2″) of the miter square, stop (6) and the end stop (24). A frame molding pattern (27), shown in FIG. 4, has the same structure as a finished piece of cut frame molding, i.e., the molding pattern has 2 angle cut ends, except that the end angles are parallel in direction rather than opposed as with a finished cut frame molding (29), shown in FIG. 5. The molding pattern may contain a mounting groove (28) or not. If a mounting groove is used, it should be located on the side that will be adjacent to the miter square so that it will be easy to determine how to position the molding pattern, i.e., the ends are facing the proper directions. Various size frame molding patterns may be used. The size used depends on the desired final length of the molding being cut. For example, if the leg of the miter square is 18 inches and a molding 7 inches in length is desired, an 11 inch frame molding pattern is utilized, i.e., the desired length of the molding being cut is subtracted from the length of the miter square leg in order to determine the molding pattern size necessary to result in the appropriate length for the molding being cut. When the molding pattern is placed in position against the miter square edge and end stop with the cut end of the molding being cut (25) being placed adjacent to the cut end of the molding pattern, the excess length of the molding (25) will extend beyond the saw slot (7) and accordingly, will be cut off by the saw when the molding is cut. By using a molding pattern, the final length of the molding being cut is determined without physical or subjective measurement and remains accurate during the cutting because the molding being cut is not free to move in any direction. The final length of the molding can be confirmed by reference to the measuring scale on top of the miter square. Various size frame molding patterns may be used thereby providing versatility in the length of the molding. The frame molding patterns may be formed using the apparatus of the invention. However, to insure accuracy careful measurement will be necessary prior to securing the molding in a cutting position.

The size of the picture frame moldings which may be cut are limited only by the size of the picture frame molding holding and cutting apparatus. The stops (5)

and (6) may be positioned on the base (1) at any suitable distance from the miter square so that various width frames may be held between the stop and the miter square. Additionally, the legs of the miter square may extend to any suitable length. The size of the apparatus depends upon the use and the portability desired in the apparatus. The standard picture frame sizes have mounting groove lengths measuring, in inches, 5×7, 8×10, 9×12, 11×14, 12×16 and 14×18. For any of these standard sizes to be made, the legs of the miter square only have to extend 18 inches. The apparatus of the invention incorporating an 18 inch miter square provides for a convenient and portable picture frame molding holding and cutting apparatus. The sizes required for the frame molding patterns in order to cut moldings to be used in the making of standard sized picture frames when using an 18 inch miter square are as follows:

| Finished Frame Size | Frame Molding Pattern Sizes Required. |
|---|---|
| 5 × 7 | 13 inch and 11 inch |
| 8 × 10 | 10 inch and 8 inch |
| 9 × 12 | 9 inch and 6 inch |
| 11 × 14 | 7 inch and 4 inch |
| 12 × 16 | 6 inch and 2 inch |
| 14 × 18 | 4 inch only |

It is understood that only one molding pattern of a given length is required since the molding patterns are usable in any combination. To provide for more versatility in the use of borders along the edge of a picture or to have a frame better fit a picture having a border, the length of the picture frame molding pattern may be extended to adapt to the size of the border. For standard finished frame sizes as listed above, the addition of an eighth of an inch to the length of the frame molding pattern will be sufficient to produce a molding having a length sufficient to form a frame side for a picture having a standard white border such as used with photographs.

As commonly known, a picture frame is four sided with the two pairs of opposite sides being equal in length. To construct a picture frame using the apparatus of the invention, four cutting operations are required in total due to the four molding pieces required to make a picture frame. However, only two different sizes are required due to the opposite sides being of equal length. The necessity of equal parallel moldings in making a picture frame is when the accuracy and simplicity of the apparatus and method of the invention becomes most apparent.

FIGS. 1, 2 and 3 each show the right-hand side of the drawing, as being the location of the uncut molding and first cutting operation and the left-side of the drawing as the location of the molding with one end cut, the pattern molding and the end stop. It is understood that the method of cutting and, where necessary, the apparatus arrangement can be reversed. In reversing the cutting operations when a molding pattern is used, it would be necessary to position the end stop (24) on the end of the miter square leg used in the second cutting operation and to make sure the direction of the angle cut of the molding pattern complements the cut end of the molding being cut during the second cutting operation. If a molding pattern is not utilized, no end stop is required and therefore no rearrangement of the apparatus is required.

The apparatus of the invention may be made of any suitable material. The base, stops and miter square are preferrably made of wood, however, metal is also suitable. The end stop may be made of any suitable rigid material, preferrably metal.

As will be apparent to one skilled in the art, various modifications can be made within the scope of the aforesaid description. Such modifications being within the ability of one skilled in the art form a part of the present invention and are embraced by the appended claims.

It is claimed:

1. A material holding and cutting apparatus comprising in combination and operable association: (a) a base; (b) a miter square affixed to the top surface of said base; (c) a slot located in said base for receiving a cutting tool, said slot extending from the edge of said base opposite the right angle of said miter square and passing through said right angle of said miter square; (d) two adjustable stops each movably affixed to said base, with one stop positioned in a spaced parallel relationship to each outwardly facing side of said miter square; (e) at least one securing means for each of said adjustable stops; and (f) two clamping means, one affixed to the top surface of each of said stops and facing in the general direction of said miter square, each clamping means being upwardly and downwardly adjustable.

2. The material holding and cutting apparatus of claim 1 wherein said base has two or more support blocks affixed to the bottom of said base not intersecting with said slot.

3. The material holding and cutting apparatus of claim 1 wherein said clamping means each have a rubber or plastic clamping head.

4. The material holding and cutting apparatus of claim 1 wherein one end of one leg of the miter square, said end not being located at the right angle of the miter square, contains an end stop affixed thereto.

5. The material holding and cutting apparatus of claim 1 wherein said stops each have two securing means for each of said stops comprising two oblong slots in each of said stops, one oblong slot on each side of said clamping means, said slots extending substantially the entire width of said stops, having a screw means projecting upwardly through each of said oblong slots and an adjustable screw fastening means affixed to the screw means.

6. The material holding and cutting apparatus of claim 1 wherein said clamping means each have a means of adjusting the height of the clamping head of said clamping means which contacts the material to be cut.

7. The material holding and cutting apparatus of claim 1 wherein said stops are rectangular in shape.

8. A method of cutting a picture frame molding comprising: (a) positioning said molding having a mounting groove on one side thereof between (1) the outside edge of one leg of a miter square, (2) an adjustable stop and (3) a clamping means, with said mounting groove facing said outside edge of the miter square and one end of said molding intersecting a saw slot which extends through the right angle of said miter square; (b) sliding said adjustable stop toward the miter square until it presses said molding against said miter square, securing said adjustable stop in position and adjusting said clamping means until it contacts said molding; (c) cutting said molding at the point of intersection between said molding and said saw slot; (d) removing said cut molding from between said outside edge of said miter square, said adjustable stop and said clamping means; (e) placing said cut molding between the second outside leg edge of said miter square, a second adjustable stop and a second clamping means with the uncut end of said molding intersecting said saw slot at said right angle of said miter square; (f) sliding said second adjustable stop toward said miter square until it presses said molding against said miter square, securing said second adjustable stop in position and adjusting said clamping means until it contacts said molding; and (g) cutting said molding at the point of intersection between said saw slot and said molding.

9. A method of cutting a picture frame molding comprising: (a) positioning said molding having a mounting groove on one side thereof between (1) the outside edge of one leg of a miter square, said miter square leg not containing an end stop at the end of the leg opposite the right angle of the miter square, (2) and adjustable stop and (3) a clamping means, with said mounting groove facing said outside edge of the miter square and one end of said molding intersecting a saw slot which extends through the right angle of said miter square; (b) sliding said adjustable stop toward the miter square until it presses said molding against said miter square, securing said adjustable stop in position and adjusting said clamping means until it contacts said molding; (c) cutting said molding at the point of intersection between said molding and said saw slot; (d) removing said cut molding from between said outside edge of said miter square, said adjustable stop and said clamping means; (e) placing said cut molding between the second outside leg edge of said miter square, a second adjustable stop and a second clamping means with the uncut end of said molding intersecting said saw slot at said right angle of said miter square; (f) positioning a frame molding pattern between said second outside leg edge of said miter square, the said second adjustable stop, said cut end of said molding and an end stop located at the end of said second miter square leg opposite said right angle; (g) sliding said second adjustable stop toward said miter square until it presses said molding and said molding pattern against said miter square, securing said second adjustable stop in position and adjusting said clamping means until it contacts said molding; and (h) cutting said molding at the point of intersection between said saw slot and said molding.

10. A method of constructing a picture frame comprising: (a) positioning a frame molding having a mounting groove on one side thereof between (1) the outside edge of one leg of a miter square, (2) an adjustable stop and (3) a clamping means, with said mounting groove facing said outside edge of the miter square and one end of said molding intersecting a saw slot which extends through the right angle of said miter square; (b) sliding said adjustable stop toward the miter square until it presses said molding against said miter square, securing said adjustable stop in position and adjusting said clamping means until it contacts said molding; (c) cutting said molding at the point of intersection between said molding and said saw slot; (d) removing said cut molding from between said outside edge of said miter square, said adjustable stop and said clamping means; (e) placing said cut molding between the second outside leg edge of said miter square, a second adjustable stop and a second clamping means with the uncut end of said molding intersecting said saw slot at said right angle of said miter square; (f) sliding said second adjustable stop toward said miter square until it presses said molding against said miter square, securing said second adjustable stop in position and adjusting said clamping means until it contacts said molding; (g) cutting said molding at the point of intersection between said saw slot and said molding; (h) removing said molding from between said second outside side of said miter square, said second adjustable stop and said clamping means; (i) performing steps (a) through (h) four times with four separate moldings wherein two of said moldings are equal in their final length to the other two moldings; and (j) joining said four moldings together to form a picture frame.

11. A method of constructing a picture frame comprising: (a) positioning a frame molding having a mounting groove on one side thereof between (1) the outside edge of one leg of a miter square, said miter square leg not containing an end stop at the end of the leg opposite the right angle of the miter square, (2) an adjustable stop and (3) a clamping means, with said mounting groove facing said outside edge of the miter square and one end of said molding intersecting a saw slot which extends through the right angle of said miter square; (b) sliding said adjustable stop toward the miter square until it presses said molding against said miter square, securing said adjustable stop in position and adjusting said clamping means until it contacts said molding; (c) cutting said molding at the point of intersection between said molding and said saw slot; (d) removing said cut molding from between said outside edge of said miter square, said adjustable stop and said clamping means; (e) placing said cut molding between the second outside leg edge of said miter square, a second adjustable stop and a second clamping means with the uncut end of said molding intersecting said saw slot at said right angle of said miter square; (f) positioning a frame molding pattern between said second outside leg edge of said miter square, said second stop, said cut end of said molding and an end stop located at the end of said second miter square leg opposite said right angle; (g) sliding said second adjustable stop toward said miter square until it presses said molding and said molding pattern against said miter square, securing said second adjustable stop in position and adjusting said clamping means until it contacts said molding; (h) cutting said molding at the point of intersection between said saw slot and said molding; (i) removing said molding from between said second outside edge of said miter square, said second adjustable stop and said second clamping means; (j) performing steps (a) through (i) four times with four separate moldings wherein two of said moldings are equal in their final length to the other two moldings; and (k) joining said four moldings together to form a picture frame.

* * * * *